United States Patent
Nazri

(10) Patent No.: US 7,393,393 B2
(45) Date of Patent: Jul. 1, 2008

(54) GUEST-HOST HYDROGEN STORAGE MATERIAL

(75) Inventor: Gholam-Abbas Nazri, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 375 days.

(21) Appl. No.: 11/208,446

(22) Filed: Aug. 19, 2005

(65) Prior Publication Data

US 2007/0039473 A1    Feb. 22, 2007

(51) Int. Cl.
*F17C 11/00* (2006.01)
*C01B 3/00* (2006.01)

(52) U.S. Cl. ..................................... 96/108; 502/526

(58) Field of Classification Search ............... 423/248, 423/648.1; 96/108; 95/116; 502/400, 526; 206/0.7; 252/188.25; 429/218.2
See application file for complete search history.

(56) References Cited

U.S. PATENT DOCUMENTS

| | | | |
|---|---|---|---|
| 5,571,292 A * | 11/1996 | Sotomura et al. | 29/623.5 |
| 6,294,142 B1 * | 9/2001 | Nazri | 423/275 |
| 2005/0075245 A1 * | 4/2005 | Goddard et al. | 502/417 |
| 2005/0211091 A1 * | 9/2005 | Moudrakovski et al. | 95/139 |
| 2006/0030483 A1 * | 2/2006 | Jang | 502/400 |

FOREIGN PATENT DOCUMENTS

JP    2004-268022 A  *  9/2004

\* cited by examiner

*Primary Examiner*—Frank M Lawrence

(57) ABSTRACT

A hydrogen storage and release material is provided in the form of a supportive host component that carries or contains a hydrogen absorbing guest material. Metal compounds, such as oxides, carbides, nitrides, or the like, are prepared to carry polyaromatic molecules that absorb hydrogen in conjugated double bonds. Examples of suitable guest-host materials include layers of vanadium oxide with interacted layers of polyaniline or polythiophene. Dopant elements, like nickel, in the host oxide can enhance hydrogen absorption and desorption in the host material.

11 Claims, 1 Drawing Sheet

GUEST-HOST HYDROGEN STORAGE MATERIAL

TECHNICAL FIELD

This invention pertains to mixed compositions for storage and release of hydrogen. More specifically, this invention pertains to guest-host materials for storing hydrogen in which inorganic metal compound particles (host) are adapted for carrying aromatic polymers (guest) selected for reversibly absorbing hydrogen.

BACKGROUND OF THE INVENTION

Hydrogen can serve as a fuel in combustion or electrochemical power-delivering systems, but the storage of hydrogen fuel at moderate pressures and close-to-ambient temperatures is a challenge. For vehicle applications it is necessary to carry sufficient hydrogen on-board for power plant operation over a suitable travel distance before refueling. This requires storing hydrogen in a compact and safe storage vessel from which hydrogen gas can be delivered on demand from an engine, fuel cell, or the like.

Liquefaction of hydrogen would provide a dense storage medium, but it requires very low temperatures that are not practically maintained in most vehicle applications. Progress has been made in temporarily fixing hydrogen in metal hydride compounds but hydrogen storage capacity is low and high temperatures are required for hydrogen release. There remains a need for ways and materials capable of temporarily storing hydrogen for delivery to a vehicle powering device.

SUMMARY OF THE INVENTION

This invention provides a hydrogen storage media in the form of layers of a crystalline inorganic metal compound material that supports an organic polymer hydrogen storage material. In a preferred embodiment, the metal compound is formed as a crystalline precursor into which molecular clusters of hydrogen absorbing polymer are intercalated. For example, layered crystals of a metal oxide act as host material and layers of a hydrogen absorbing polyaromatic with conjugated double bonds are a guest material.

Metal oxides that can be crystallized in oxygen and metal atom containing spaced-apart layers are examples of suitable host materials. Lithium cobalt oxide, molybdenum oxide, lithium nickel oxide, and vanadium oxide are examples of metal oxides that can be prepared as such layered oxide crystalline structures. Other binary, ternary, and multi-metal cation containing oxides also form suitable crystalline structures. In addition to metal oxide materials, there are also certain metal sulfides, metal nitrides, metal hydroxides, and metal oxyhalides that can be prepared in two-dimensional layered crystalline form or three-dimensional space containing crystalline form. In a simpler embodiment of the invention, the host metal compound is used as a particle that is coated with the guest polymer. Such individual or mixed metal compounds are formed in accordance with this invention to serve as a structural host material carrying a suitable hydrogen storage media.

Polymers and molecules with an abundance of conjugated double bonds are suitable as the hydrogen storage, "guest" layers. Often the conjugated bonds are provided by groups of neighboring carbon atoms but other groups of atoms in polymers may also form hydrogen absorbing conjugated bonds. Such polymers are often electrically conductive, but in accordance with this invention the conjugated bonds serve as reversible hydrogen storage sites. Polyaromatics such as polyaniline, polythiophene, or other conjugated molecules and polymers having heteroatoms such as sulfur, nitrogen and the like, are examples of such polymers with hydrogen absorption capability. One or more such conjugated aromatic polymer materials are incorporated on or into the inorganic crystalline or inorganic-organic hybrid host materials.

The inorganic host structure can be made by any of several synthesis methods including, but not limited to, high temperature ceramic techniques, a sol-gel process, a hydrothermal synthesis, microwave synthesis, sonochermical, mechano-chemical, soft chemistry, and wet chemistry such as solution and precipitation and the like. Or the host structure can be made by a thin-film technique such as chemical and physical vapor deposition, metal-organic chemical vapor deposition, combustion synthesis, or a low temperature method. Preferably, the crystal structure of the host includes a one-dimensional, two-dimensional, and/or three-dimensional space network for the guest hydrogen storage material. With this type of crystal structure the hydrogen sorbing molecules are incorporated into spaces or vacancies in the host structure. When the host material does not have such a crystal structure, the hydrogen storage material may be formed or deposited on surfaces of host particles.

In one embodiment of the invention, layered oxides or chalcogenides are intercalated with polyaromatic moiety containing polymers by direct intercalation of polymer into the inorganic host material. In a second embodiment of the invention, polymerization of the guest hydrogen absorbing material is conducted during growth or formation of the host structure. And, in a third embodiment, a monomer of the guest material is intercalated into the formed host material (or coated onto particles of the host material) and polymerization of the intercalated monomer is induced by chemical initiators, photons, and/or heat.

Some layered oxide materials or other host constituents can serve as catalysts for hydrogenation-dehydrogenation of the guest molecules. For example, when vanadium pentoxide particles are intercalated with polyaniline it is found that the vanadium oxide promotes the absorption of hydrogen by the polyaniline. Also, when layered oxide materials are partially doped with suitable metal catalysts for hydrogenation-dehydrogenation, the hydrogen sorption temperature and storage pressure of the guest polymer is modified. For example, the metal oxide constituent can be partially doped with metals such Ni, La, Pd, or Pt to facilitate release of the bonding of hydrogen to the guest polymer molecules.

In the host-guest storage system the hydrogen is retained under pressure. But, as compared with pressurized hydrogen gas, the density of hydrogen storage is increased and the pressure is significantly reduced.

Other objects and advantages of the invention will become apparent from a description of preferred embodiments of the practice of the invention.

DESCRIPTION OF PREFERRED EMBODIMENTS

EXAMPLE 1

A practice of the invention will be illustrated using vanadium pentoxide ($V_2O_5$) as the inorganic host material and polyaniline as hydrogen absorbing guest material.

An aqueous solution of sodium vanadate ($NaVO_3$) was prepared. The sodium cations were exchanged with hydrogen cations on an ion exchange column to produce a sol of vanadic acid which, upon aging, yielded a gel of vanadium oxide. The gel was dried by heating under reduced atmospheric pressure to produce a vanadium pentoxide ($V_2O_5$) powder.

The vanadium oxide powder was dispersed in a solution of aniline in a water-acetonitrile solvent mixture. The solution and dispersed particles were vigorously stirred and refluxed at 90° C. for a period of hours to form linear polyaniline molecules incorporated into the particles of vanadium pentoxide. The vanadium pentoxide appeared to promote the polymerization of aniline. The particles, now containing a mixture of vanadium oxide and polyaniline, were filtered from the liquid and dried in a rotary vacuum drier.

The dried material was a black powder containing, in proportions, about 2 parts by weight vanadium oxide and 3.5 parts by weight polyaniline.

The material was characterized by x-ray diffraction and infra-red spectroscopy. It comprised a layered structure of vanadium oxide host material with deposited and intercalated layers of generally linear polyaniline molecules as a guest material for absorption of hydrogen. The (001) x-ray diffraction lines were consistent with the formation of a layered hybrid with an amorphous deposited polymer phase.

The vanadium oxide-polyaniline host-guest powder was confined in a vessel, initially under vacuum, and heated to 200° C. Hydrogen gas was then added incrementally to achieve stepwise increased pressure levels up to about 1200 psi. The temperature of the contents of the vessel was maintained at 200° C. Hydrogen absorption to the capacity of the host-guest material took over two hours. The hydrogen absorption was endothermic. As the pressure was increased it was found that hydrogen was increasingly absorbed into the polyaniline containing material. Since polyaniline alone does not absorb such a quantity of hydrogen at 200° C. the presence of the crystalline vanadium oxide host material promoted the hydrogen storage.

Figure 1:
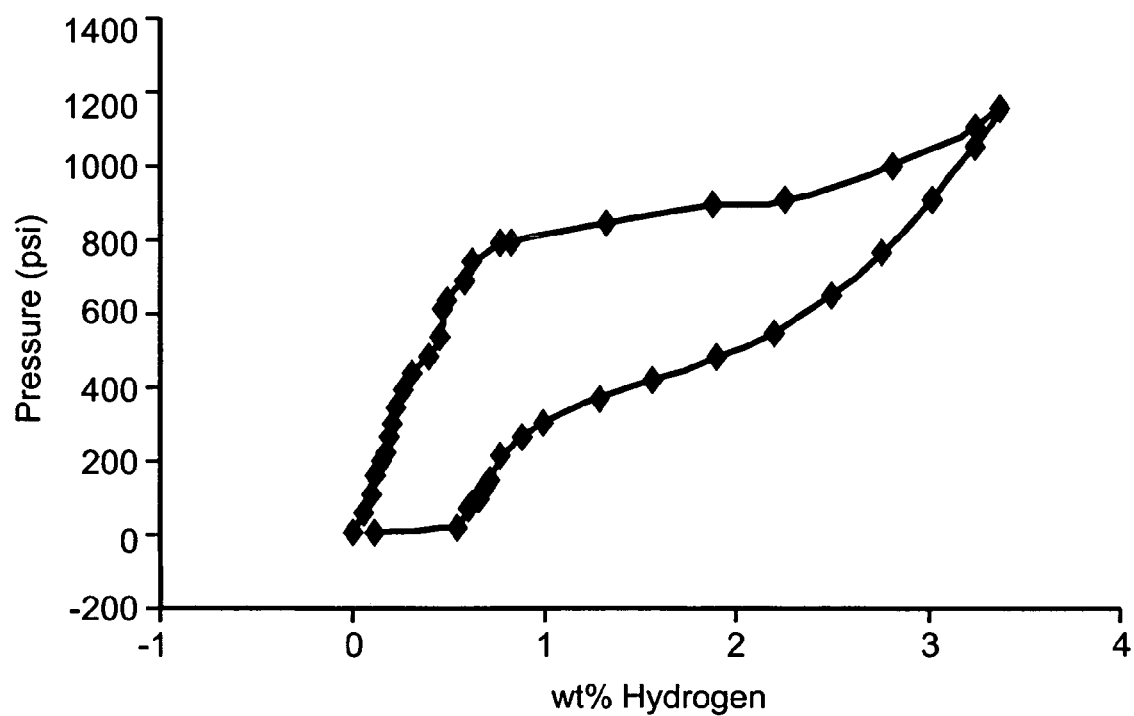
FIG. 1 is a graph of isothermal hydrogen absorption (200° C.) into, and removal from, a material consisting of vanadium pentoxide ($V_2O_5$) intercalated with polyaniline. The left-upper curve of data points summarizes increasing hydrogen content of the storage material in percent by weight with increasing pressure of hydrogen gas at 200° C. The right-lower curve summarizes the decreasing hydrogen content of the storage material as pressure on the material is reduced.

A pressure-composition-temperature system from Applied Materials Corporation was used to track hydrogen absorption in the host-guest material. The left-upper curve of FIG. 1 summarizes the amount of hydrogen absorbed in the vanadium oxide-polyaniline material with increasing hydrogen pressure at 200° C. After each increased pressure level was attained the pressure slowly decreased from the set level as hydrogen was absorbed into the hybrid material. The hydrogen pressure drops were translated into hydrogen absorption values as a percentage of weight of the host-guest material. The right-lower curve of FIG. 1 traces the release of hydrogen from the guest-host powder as reflected in the decreasing weight of the powder.

As summarized in FIG. 1, the vanadium oxide-polyaniline powder absorbed about one percent of its weight of hydrogen as the pressure of the hydrogen gas was increased to about 800 psi. As the hydrogen pressure was further increased form about 800 psi to about 1200 psi this guest-host material absorbed hydrogen to an amount of about 3.3 weight percent of the storage material. The hydrogen is mainly absorbed in the repeated carbon to carbon conjugated double bond portions of the aromatic polyaniline molecules.

As the hydrogen pressure was step-wise reduced, hydrogen was released from the conjugated aromatic bonding structure of the polyaniline molecules carried in the vanadium oxide host. At ambient pressure the vanadium oxide-polyaniline material retained about one-half weight percent hydrogen.

EXAMPLE 2

A practice of the invention will be illustrated using vanadium pentoxide doped with nickel, approximately ($V_{1.99}Ni_{0.01}$)$O_5$, as the inorganic host material and a mixture of polyaniline and polythiophene as hydrogen absorbing guest material.

An aqueous solution of sodium vanadate ($NaVO_3$) with a small amount of nickel chloride was prepared. The sodium cations were exchanged with hydrogen cations to produce a sol of vanadic acid with absorbed nickel ions which, upon aging, yielded a gel of vanadium oxide with dispersed nickel ions. The gel was dried by heating under reduced atmospheric pressure to produce a nickel-doped vanadium pentoxide powder approximating ($V_{1.99}Ni_{0.01}$)$O_5$.

The nickel-doped vanadium oxide powder was dispersed in a solution of aniline and thiophene in a water-acetonitrile solvent mixture. Three parts by weight of aniline and one part by weight of thiophene were used. The solution was refluxed for a period of hours at 90° C. to form a mixture of generally linear polyaniline and polythiophene molecules which were incorporated into the particles of nickel-doped vanadium pentoxide. The particles, now containing a mixture of vanadium (nickel) oxide plates with intercalated polyaniline and polythiophene molecules, were filtered from the liquid and dried in a rotary vacuum drier.

The dried material was a black powder containing about 2 parts by weight of vanadium (doped with nickel) oxide and 3.5 parts by weight total of polyaniline-polythiophene. The material was characterized by x-ray diffraction and infra-red spectroscopy. It was perceived as comprising a layered structure of nickel-doped vanadium oxide host material with intercalated layers of generally linear polyaniline-polythiophene molecules guest material for absorption of hydrogen.

The vanadium-nickel oxide-polyaniline and polythiophene host-guest material was confined in a vessel initially under vacuum and heated to 200° C. Hydrogen gas was added to the vessel to attain stepwise pressure levels in the vessel. A pressure-composition-temperature system from Applied Materials Corporation was used to track hydrogen absorption. Pure hydrogen was applied in increasing pressure increments to a maximum pressure of about 1200 psi. At each increasing pressure step the pressure fell off from the increased level as hydrogen was absorbed into the hybrid material. The hydrogen pressure drops were translated into hydrogen absorption values as a percentage of weight of the host-guest material.

Figure 2:
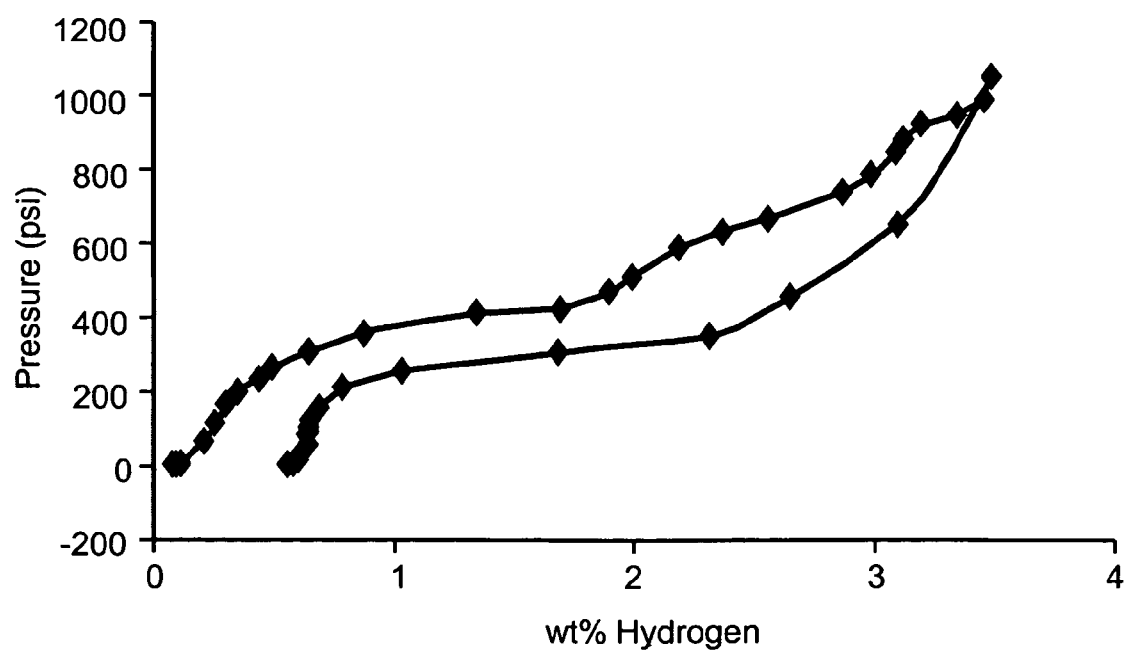
FIG. 2 is a graph of isothermal hydrogen absorption (200° C.) into, and removal from, a material consisting of nickel-doped vanadium pentoxide ($V_{1.99}Ni_{0.01}O_5$) intercalated with a mixture of polyaniline and polythiophene. The left-upper curve of data points summarizes increasing hydrogen content of the storage material in percent by weight with increasing pressure of hydrogen gas. The right-lower curve summarizes the decreasing hydrogen content of the storage material as pressure on the material is reduced.

The left-upper curve of FIG. 2 summarizes the amount of hydrogen absorbed in the vanadium oxide-polyaniline-polythiophene material with increasing hydrogen pressure at 200° C. The amount of hydrogen absorbed is measured by the percentage increase in weight of the guest-host powder. The right-lower curve of FIG. 2 traces the release of hydrogen from the guest-host powder as reflected in the decreasing weight of the powder.

As summarized in FIG. 2, the vanadium oxide-polyaniline powder absorbed about one percent of its weight of hydrogen as the pressure of the hydrogen gas was increased to about 400 psi. As the hydrogen pressure was further increased form about 400 psi to about 800 psi the guest-host material absorbed about three percent hydrogen. And at 1100 psi this guest-host material absorbed hydrogen in an amount of about 3.3 weight percent of the storage material. In this example the presence of nickel in the vanadium oxide appeared to promote the take-up of hydrogen in the polyaromatic polymer molecules and release of hydrogen at lower pressures.

As the hydrogen pressure was step-wise reduced, hydrogen was, released from the polyaniline-polythiophene. At ambient pressure the nickel doped vanadium oxide-polyaromatic material retained about one-half weight percent hydrogen.

The practice of the invention has been illustrated using vanadium oxide and nickel-doped vanadium oxide as the host material. Other metals form suitable oxides, sulfides, nitrides, hydroxides, or the like for providing the carrier function of the host material in the hydrogen storage materials of this invention.

In general, the hydrogen absorption is accomplished using an aromatic polymer with repeated conjugated double bond combinations in the molecules for temporary storage of hydrogen. The host material may be formed to carry the guest material in one-dimensional, two-dimensional or three-dimensional spaces. In the above examples, the guest material (the polyaromatic molecules) was distributed in generally two-dimensional layers. But the guest material can suitably be incorporated as linear strands or as rod-like bodies in a host structure providing one dimensional tunnels or three-dimensional compartments. Or the guest material may be carried as a coating on particles of host material.

Polyaniline and polythiophene are simply readily available and inexpensive examples of suitable guest materials in the guest-host hydrogen storage materials of this invention. Other polyaromatic materials may be adapted for use in host-guest hydrogen absorbing combinations.

Accordingly, the scope of the invention is not limited by the illustrative embodiments.

The invention claimed is:

1. A material for storage of hydrogen, the material comprising particles of a host component of an inorganic crystalline metal compound carrying a guest component of polymer molecules including conjugated double bonds for releasable storage of hydrogen, the guest component being carried in the crystalline host component as intercalated polymer molecules.

2. A material for storage of hydrogen as recited in claim 1 in which the host component comprises a crystalline metal oxide.

3. A material for storage of hydrogen as recited in claim 1 in which the guest component comprises an organic polymer comprising aromatic monomer moieties.

4. A material for storage of hydrogen as recited in claim 1 in which the host component comprises vanadium pentoxide and the guest component comprises a polymer selected from the group consisting of polyaniline and polythiophene.

5. A material for hydrogen storage as recited in claim 1 in which the guest component comprises polymer molecules containing conjugated carbon-to-carbon double bonds.

6. A material for hydrogen storage as recited in claim 1 in which the guest component comprises polymer molecules containing carbon and heteroatom conjugated double bonds.

7. A material for hydrogen storage as recited in claim 1 in which the guest component comprises polymer molecules containing carbon and sulfur conjugated double bonds.

8. A material for hydrogen storage as recited in claim 1 in which the guest component comprises polymer molecules containing carbon and nitrogen conjugated double bonds.

9. A material for hydrogen storage as recited in claim 1 in which the host component comprises one or more inorganic layered crystalline compounds selected from the group consisting of metal sulfides, metal nitrides, metal hydroxides, and metal oxyhalides.

10. A material for hydrogen storage as recited in claim 2 in which the host component comprises a metal oxide doped for catalysis of hydrogenation and dehydrogenation of the hydrogen storage material with one or more elements selected from the group consisting of lanthanum, nickel, palladium and platinum.

11. A material for storage of hydrogen, the material comprising particles of a host component comprising a metal oxide selected from the group consisting of vanadium pentoxide and vanadium pentoxide doped with nickel, the host component carrying a guest component comprising a polymer including conjugated double bonds for releasable storage of hydrogen where the polymer guest component is a polymer selected from the group consisting of polyaniline and polythiophene, the guest component being carried in the host component as intercalated polymer molecules.

* * * * *